3,148,189
5-ETHYL-5-m-TRIFLUOROMETHYLPHENYL-
BARBITURIC ACID
Wilburn J. Doran, Indianapolis, Ind., assignor to Eli
Lilly and Company, Indianapolis, Ind., a corporation
of Indiana
No Drawing. Filed Jan. 15, 1962, Ser. No. 166,424
3 Claims. (Cl. 260—257)

This invention relates to a novel barbituric acid derivative with unusual properties.

The compound provided by this invention, 5-ethyl-5-m-trifluoromethylphenylbarbituric acid, can be represented by the following structural formula:

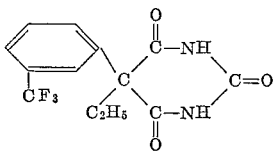

Also within the scope of this invention are the salts of the above compound with nontoxic cations, for example the sodium salt, the potassium salt, the ammonium salt, and the like.

The compound of the present invention is a highly effective hypnotic agent, having a slow onset and long duration of action. Additionally, it produces marked skeletal muscle relaxation at doses only about half as great as those at which the lowest order of motor impairment is observed. This property of 5-ethyl-5-m-trifluoromethylphenylbarbituric acid is entirely unexpected, since with most commonly used barbituric acid derivatives, such as phenobarbital, for example, skeletal muscle relaxation is not observed at doses below the sedative dose. The compound can be administered orally in the form of a tablet or capsule containing the free barbituric acid or a physiologically acceptable cationic salt thereof, or parenterally in the form of an isotonic solution of a physiologically acceptable cationic salt of the barbituric acid.

5-ethyl-5-m-trifluoromethylphenylbarbituric acid is a white, crystalline solid melting at 191–3° C., which can be prepared by the following preferred reaction sequence:

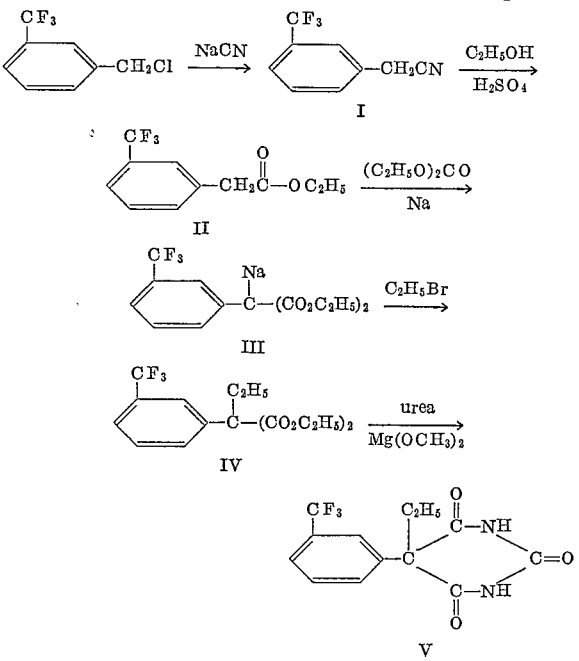

In the above sequence, the m-trifluoromethylphenylacetonitrile (I) is obtained by the reaction of m-trifluoromethylbenzyl chloride and sodium cyanide in aqueous ethanol. This nitrile is esterified directly with ethanol-sulfuric acid to ethyl m-trifluoromethylphenylacetate (II). The ester is treated with sodium and diethyl carbonate to give the sodium salt of diethyl-m-trifluoromethylphenylmalonate (III), the ethylation of which yields diethyl α-ethyl-α-(m-trifluoromethylphenyl)malonate (IV). The intermediate sodium salt (III) can be alkylated directly, if desired, without isolation. Alternatively, the diethyl-m-trifluoromethylphenylmalonate can be isolated and alkylated in the conventional manner employing sodium and ethyl bromide to yield the disubstituted malonic ester (IV). This ester is then condensed with urea to give the desired 5-ethyl-5-m-trifluoromethylphenylbarbituric acid (V). The desired compound can also be prepared by condensation of the ester (IV) with guanidine, followed by hydrolysis of the resulting 2-imino compound with hydrochloric acid.

Preparation of the cationic salts of 5-ethyl-5-m-trifluoromethylphenylbarbituric acid can be carried out by dissolving the barbituric acid in a suitable solvent, such as ethanol, and adding a stoichiometric quantity of a base, such as sodium hydroxide, potassium hydroxide, sodium ethoxide, or the like. The solvent is removed in vacuo, preferably using freeze-drying techniques, leaving the desired salt as an amorphous residue. Great care must be exercised in the handling of the cationic salt prior to crystallization since such salts are known to be highly hygroscopic in the noncrystalline state.

In order to illustrate the operation of the invention, the following description is provided by way of example.

EXAMPLE

*Preparation of 5-Ethyl-5-m-Trifluoromethylphenyl-barbituric Acid*

A solution of 72 g. of sodium cyanide in 65 ml. of water and 185 ml. of 95 percent aqueous ethanol is treated with 244 g. of m-trifluoromethylbenzyl chloride. The resulting solution is heated under reflux for six hours and is then cooled. After most of the alcohol has been removed under vacuum, the residue is treated with 250 ml. of water and the black oily, lower layer is separated, washed with water, and dried over anhydrous magnesium sulfate. The m-trifluoromethylphenylacetonitrile is distilled under vacuum, and the fraction boiling at about 107–110° C. at a pressure of about 11 mm. of mercury is collected; $N_D^{25}=1.4568-1.4569$.

*Analysis.*—Calc. for $C_9H_6F_3N$: C, 58.38; H, 3.27; N, 7.57. Found: C, 59.91; H, 3.69; N, 8.02.

A solution of 87 g. of m-trifluoromethylphenylacetonitrile in 115 ml. of 95 percent aqueous ethanol is mixed with 92 g. of concentrated sulfuric acid and the resulting solution is stirred and heated under reflux for eight hours. The reaction mixture is then cooled and diluted with 300 ml. of water. The oily layer which forms is separated and washed successively with water and with one percent aqueous sodium hydroxide. After being dried over anhydrous magnesium sulfate, the ethyl m-trifluoromethylphenylacetate is distilled at reduced pressure and boils at about 98–100° C. at a pressure of about 10 mm. of mercury; $N_D^{25}=1.4435-1.4448$.

*Analysis.*—Calc. for $C_{11}H_{11}F_3O_2$: C, 56.90; H, 4.78. Found: C, 57.15; H, 5.13.

A solution of 100 g. of ethyl m-trifluoromethylphenylacetate and 260 ml. of diethyl carbonate is heated to about 115° C. While the reaction temperature is maintained between about 115° C. and about 120° C., 9.9 g. of sodium are added in small pieces to the vigorously stirred solution during one hour. The reaction temperature is maintained in the same range for an additional hour after the addition of sodium has been completed. The alcohol formed during the reaction is allowed to distill from the reaction mixture during the addition and the subsequent heating period. The black reaction mixture is cooled, excess diethyl carbonate is removed by distillation, and the residue is diluted with 200 ml. of ice water. Acidification with a 1:1 mixture of concentrated hydrochloric acid and water causes the separation of an oily layer which is drawn off, washed successively with water and an aqueous sodium bicarbonate solution, and dried over anhydrous magnesium sulfate. The product, diethyl m-trifluoromethylphenylmalonate, is distilled at reduced pressure and boils at about 145–150° C. at a pressure of about 10 mm. of mercury; $N_D^{25}=1.4501–1.4510$.

*Analysis.*—Calc. for $C_{14}H_{15}F_3O_4$: C, 55.26; H, 4.97. Found: C, 55.50; H, 5.08.

To a stirred solution of 61 g. of diethyl m-trifluoromethylphenylmalonate and 26 g. of ethyl bromide there is added slowly a solution prepared by adding 4.6 g. of sodium to 90 ml. of absolute ethanol. The temperature of the reaction mixture is maintained in the range 40–50° C. during the addition, which requires about three hours. The reaction is heated for five additional hours at about 45–50° C. When the reaction mixture has cooled to room temperature, part of the alcohol is distilled under vacuum and the residue is diluted with 200 ml. of water. The oily layer which separates is washed with water, dried over anhydrous magnesium sulfate, and distilled. The diethyl ethyl - m - trifluoromethylphenylmalonate so obtained boils at about 145–147° C. at about 1 mm. of mercury; $N_D^{25}=1.4517–1.4525$.

*Analysis.*—Calc. for $C_{16}H_{19}F_3O_4$: C, 57.83; H, 5.76. Found: C, 57.95; H, 5.90.

If desired, the two preceding reactions can be combined into one step. Instead of isolating the diethyl m-trifluoromethylphenylmalonate, the solution containing its sodium derivative can be treated with ethyl bromide to give the diethyl ethyl-m-trifluoromethylphenylmalonate directly.

The desired 5-ethyl-5-m-trifluoromethylphenylbarbituric acid can be obtained by employing one of several alternative procedures. In one preferred method, magnesium methoxide is first prepared by treating 4.8 g. of magnesium with 45 ml. of methanol. The addition of about 0.5 ml. of carbon tetrachloride is beneficial in promoting the reaction. After the magnesium has gone into solution, 21.4 g. of diethyl ethyl-m-trifluoromethylphenylmalonate and 7.2 g. of urea are added. The mixture is heated under reflux for seventeen hours, cooled, and diluted with about 50 ml. of water. Acidification with a 1:1 mixture of concentrated hydrochloric acid and water causes the precipitation of a white precipitate of the 5-ethyl-5-m-trifluoromethylphenylbarbituric acid. This is separated by filtration, washed with water, and recrystallized from dilute ethanol; M.P. 191–193° C.

*Analysis.*—Calc. for $C_{13}H_{11}F_3N_2O_3$: C, 51.99; H, 3.69; N, 9.33. Found: C, 52.03; H, 3.85; N, 9.10.

Guanidine can be substituted for urea in the condensation with diethyl ethyl-m-trifluoromethylphenylmalonate. The resulting 2-imino derivative can be hydrolyzed with hydrochloric acid to the desired barbituric acid derivative.

I claim:

1. A compound selected from the group consisting of 5-ethyl-5-m-trifluoromethylphenylbarbituric acid and the salts thereof with nontoxic cations.

2. 5-ethyl-5-m-trifluoromethylphenylbarbituric acid.

3. Sodium 5 - ethyl-5-m-trifluoromethylphenylbarbiturate.

References Cited in the file of this patent

UNITED STATES PATENTS

| | | |
|---|---|---|
| 1,025,872 | Hoerlein | May 7, 1912 |
| 1,923,239 | Taub et al. | Aug. 22, 1933 |

OTHER REFERENCES

Caldwell et al.: Jour. Amer. Chem. Soc., vol. 73, pages 5125–5127 (1951).

The Merck Index, pages 794–795 (1960), seventh edition.

Yale, Journal of Medicinal and Pharmaceutical Chemistry, vol. I, No. 2, pages 122–132 (1959).